(12) United States Patent
Mallardo et al.

(10) Patent No.: US 9,171,137 B2
(45) Date of Patent: *Oct. 27, 2015

(54) SYSTEMS AND METHODS FOR ENABLING AN AUTOMATIC LICENSE FOR MASHUPS

(71) Applicant: United Video Properties, Inc., Santa Clara, CA (US)

(72) Inventors: Amanda Mallardo, Streamwood, IL (US); Matthew Pakulski, Oak Park, IL (US); Jeffrey Gibson, Iowa City, IA (US); Mycal Elliot, Chicago, IL (US); Michael R. Nichols, La Canada Flintridge, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/310,929

(22) Filed: Jun. 20, 2014

(65) Prior Publication Data

US 2015/0020216 A1 Jan. 15, 2015

Related U.S. Application Data

(63) Continuation of application No. 13/630,782, filed on Sep. 28, 2012, now Pat. No. 8,799,170.

(51) Int. Cl.
*G06F 21/10* (2013.01)
*G06F 21/60* (2013.01)
(Continued)

(52) U.S. Cl.
CPC ........ *G06F 21/105* (2013.01); *G06F 17/30424* (2013.01); *G06F 21/60* (2013.01); *G06Q 20/1235* (2013.01); *G06F 17/30017* (2013.01); *G06F 21/10* (2013.01); *G11B 27/031* (2013.01);

(Continued)

(58) Field of Classification Search
CPC .............. G06F 21/10; G06F 17/30017; H04L 2463/101; H04L 2463/103; H04L 2209/603; G06Q 20/123
See application file for complete search history.

(56) References Cited

U.S. PATENT DOCUMENTS 7,249,029 B2 * 7/2007 Martin et al. .................... 705/59
8,180,708 B2 * 5/2012 Hurtado et al. ................. 705/57

(Continued)

OTHER PUBLICATIONS

Nicholas Diakopoulos, Kurt Luther, Yevgeniy (Eugene) Medynskiy, and Irfan Essa. 2007. The evolution of authorship in a remix society. In Proceedings of the eighteenth conference on Hypertext and hypermedia (HT '07). ACM, New York, NY, USA, 133-136.*

*Primary Examiner* — Jason K. Gee
*Assistant Examiner* — Zhimei Zhu
(74) *Attorney, Agent, or Firm* — Ropes & Gray LLP

(57) ABSTRACT

Systems and methods for managing digital rights settings are provided. In some aspects, the systems and methods described include receiving user input including an order for obtaining access rights to a media asset. Control circuitry determines whether the media asset is associated with a first package of media assets. The control circuitry cross-references a database of user order history to determine whether the user has obtained access rights for each media asset in the first package of media assets. If the user has obtained access rights for each media asset in the first package of media assets, the control circuitry generates digital rights settings for each media asset in the first package of media assets to enable the user to create a mashup. The mashup includes portions of at least one media asset in the first package. The control circuitry generates a display based on the digital rights settings.

16 Claims, 5 Drawing Sheets

(51) Int. Cl.
*G06Q 20/12* (2012.01)
*G06F 17/30* (2006.01)
*G11B 27/031* (2006.01)

(52) U.S. Cl.
CPC ........ *H04L 2463/101* (2013.01); *Y10S 705/902* (2013.01)

(56) References Cited

U.S. PATENT DOCUMENTS

| | | | |
|---|---|---|---|
| 8,199,935 B2* | 6/2012 | Davidson | 381/119 |
| 8,601,372 B1* | 12/2013 | Gentile et al. | 715/716 |
| 2006/0053077 A1* | 3/2006 | Mourad et al. | 705/51 |
| 2006/0064381 A1* | 3/2006 | Tamori | 705/51 |
| 2007/0083496 A1* | 4/2007 | Martinez | 707/3 |
| 2007/0083497 A1* | 4/2007 | Martinez | 707/3 |
| 2007/0083537 A1* | 4/2007 | Martinez | 707/101 |
| 2007/0083558 A1* | 4/2007 | Martinez | 707/104.1 |
| 2007/0083762 A1* | 4/2007 | Martinez | 713/176 |
| 2007/0094139 A1* | 4/2007 | Martinez | 705/40 |
| 2007/0162876 A1* | 7/2007 | Quirk | 715/853 |
| 2008/0114665 A1* | 5/2008 | Teegarden | 705/26 |
| 2008/0208692 A1* | 8/2008 | Garaventi et al. | 705/14 |
| 2008/0274687 A1* | 11/2008 | Roberts et al. | 455/3.06 |
| 2009/0116668 A1* | 5/2009 | Davidson | 381/119 |
| 2009/0133130 A1* | 5/2009 | Kovalick | 726/28 |
| 2009/0210333 A1* | 8/2009 | Titus et al. | 705/35 |
| 2009/0328228 A1* | 12/2009 | Schnell | 726/26 |
| 2010/0268580 A1* | 10/2010 | Vermes | 705/14.1 |
| 2011/0161409 A1* | 6/2011 | Nair et al. | 709/203 |
| 2012/0323800 A1* | 12/2012 | Stein | 705/310 |
| 2013/0132387 A1* | 5/2013 | Nagasaka et al. | 707/736 |
| 2013/0305385 A1* | 11/2013 | Korteweg et al. | 726/27 |

* cited by examiner

SYSTEMS AND METHODS FOR ENABLING AN AUTOMATIC LICENSE FOR MASHUPS

CROSS-REFERENCE TO RELATED APPLICATIONS

This is a continuation of U.S. patent application Ser. No. 13/630,782, filed Sep. 28, 2012 (currently allowed), which is hereby incorporated by reference in its entirety.

BACKGROUND

A mashup is defined as a media asset created by combining portions of one or more media assets. For example, a mashup media asset may include overlaying the vocal track of one song over the instrumental track of another. In another example, a mashup media asset may combine portions or clips from multiple video assets. In yet another example, a mashup media asset any include portions from audio assets as well as video assets.

Commercial creators of such mashups may request copyright permissions from the original authors of the respective media assets used in their mashups. However, amateur consumers typically create and distribute their mashups utilizing original work of others without prior authorization, leading to copyright and other legal issues. Moreover, traditional systems lack an effective mechanism that assists users to create mashups from content they may own.

SUMMARY

In view of the foregoing, systems and methods for managing digital rights settings are described. The systems and methods described provide for automatically generating digital rights settings for certain media assets such that a user may utilize them to create a mashup. For example, if a user purchases or obtains access rights for a particular package of media assets, e.g., a music album, the digital rights settings for each media asset in the package may be modified to allow their use in creation of mashups. In another example, if a user obtains access rights for a particular media asset associated with a package of media assets, and the user has previously purchased all other media assets in the package, the last transaction may trigger modification or the digital rights settings for each media asset in the package to allow their use an creation of mashups.

In some embodiments, the systems and methods described provide for generating digital right settings for media assets such that only media assets within a package may be used to form a mashup. For example, if a user buys an album such as "OVEREXPOSED" by "MAROON 5", the user may receive digital rights settings to only create a mashup from portions of media assets contained within the album. In some embodiments, the systems and methods described provide for generating digital right settings for media asset such chat media assets across packages may be used to form a mashup. For example, if a user buys two albums from the same or different artists, the user may receive digital rights settings that allow creating a mashup from portions of media assets included in one or both albums.

In another example, a user may obtain access rights for a video asset such as the movie CHICAGO and also obtain access rights for the soundtrack of the movie. The systems and methods described may generate digital rights settings for both the video asset and the audio assets ouch that the user may create a mashup from combining portions of the video and the audio assets.

In some embodiments, the systems and methods described provide for generating digital right settings for media assets such that a user may create a mashup from portions of one or more of the media assets and share the mashup with another user or a friend via email. The user may also share the mashup by posting on a social network or a blog. The other user or friend accessing the mashup may be required to possess certain qualifications in order to be eligible. For example, the other user may be required to view an advertisement before accessing the mashup. In another example, the systems and methods described may request the other user to purchase or obtain access rights for the media assets used in the mashup before accessing the mashup.

In some aspects, the systems and methods described provide for a method of managing digital rights settings. The method may include receiving user input including an order for obtaining access rights to a media asset. Control circuitry may determine whether the media asset is associated with a first package of media assets. The control circuitry may cross-reference a database of user order history to determine whether the user has obtained access rights for each media asset in the first package of media assets. If the user has obtained access rights for each media asset in the first package of media assets, the control circuitry may generate digital rights settings for each media asset in the first package of media assets to enable the user to create a mashup. The mashup includes portions of at least one media asset in the first package. The control circuitry may generate a display based on the digital rights settings.

In some embodiments, the method includes modifying existing digital rights settings for each media asset in the first package to enable the user to create the mashup using the media assets. In some embodiments, each media asset in the first package includes license metadata. Generating digital rights settings for the media assets in the first passage may include updating the license metadata for each media asset.

In some embodiments, the digital rights settings allow the user to transmit the mashup to a second user via at least one of a social network and an email. In some embodiments, the second user is required to view an advertisement before the mashup is accessed. In some embodiments, the second user is required to obtain access rights for each media asset included in the mashup before the mashup is accessed.

In some embodiments, the method includes generating a display offering digital software for creating the mashup from the media assets of the first package. The digital software may allow the user to create mashups from media assets having appropriate digital rights settings.

In some embodiments, the method includes determining whether the media asset is associated with a second package of media assets. If the user has obtained access rights for each media asset in the second package, control circuitry may generate digital rights settings for each media asset in the second package to enable the user to create the mashup. In some embodiments, the method includes updating digital rights settings for each media asset in the first and second packages to include digital rights settings to create the mashup that includes portions of at least one media asset in the first and second packages.

In some embodiments, the digital rights settings for each media asset in the first package of media assets are generated based on one or more business rules.

In some aspects, the systems and methods described herein include a system for managing digital rights settings configured to execute the functionality described above.

It should be noted that the systems and/or methods described above may be applied to, or used in accordance with, other systems, methods and/or apparatuses.

BRIEF DESCRIPTION OF THE DRAWINGS

The above and other objects and advantages of the systems and methods described herein will be apparent upon consideration of the following detailed description, taken in conjunction with the accompanying drawings, in which like reference characters refer to like parts throughout, and in which.

DETAILED DESCRIPTION OF EMBODIMENTS

Figure 1:
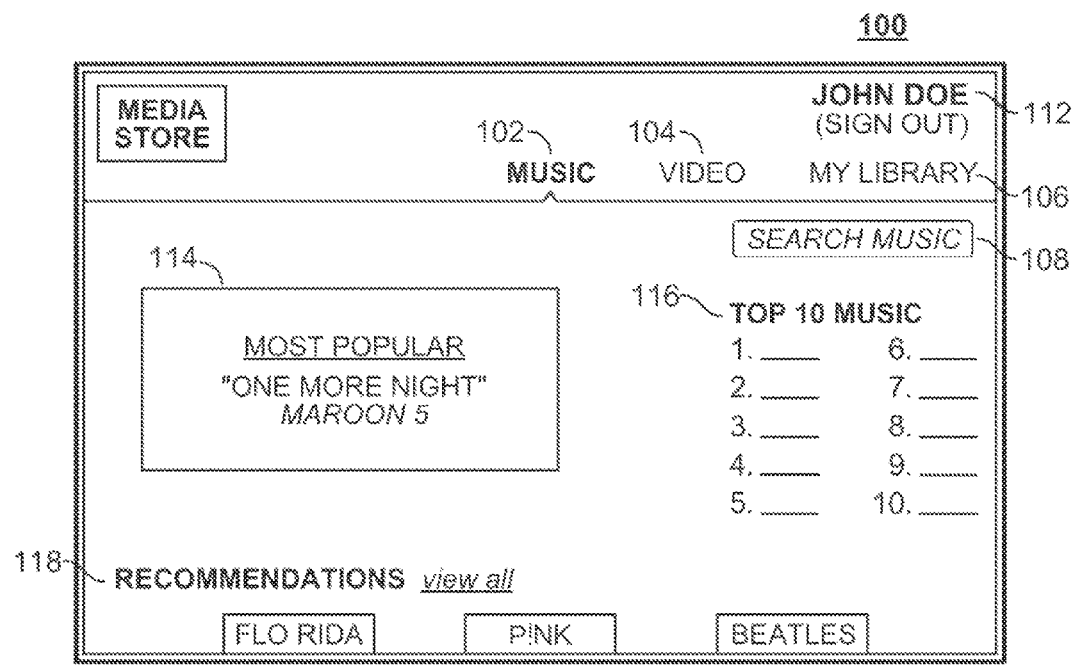
FIGS. 1 and 2 show illustrative embodiments of display screens that enable access as different types of media assets.

Systems and methods are described herein for managing digital rights settings. The systems and methods described provide for automatically generating digital rights settings for certain media assets such that a user may utilize them to create a mashup. A mashup being defined as a media asset created by combining portions of one or more media assets. For example, a mashup media asset may include overlaying the vocal track of one song over the instrumental track of another.

In some embodiments, if a user purchases or obtains access rights for a particular package of media assets, e.g., a music album, the digital rights settings for each media asset in the package may be modified to allow their use in creation of mashups. For example, it the user purchases the album "OVEREXPOSED" by artist "MAROON 5" the digital rights settings for each media asset in the album may be modified or updated to allow their use in creation of mashups.

In some embodiments, if a user obtains access rights for a particular media asset associated with a package of media assets, and the user had previously purchased all other media assets in the package, the last transaction may trigger modification of the digital rights settings for each media asset in the package to allow their use in creation of mashups. For example, if the user purchases a media asset from the album "OVEREXPOSED," and has previously purchased all other media assets in the album, the purchase of the media asset may trigger control circuitry to modify or update the digital rights settings for each media asset in the album to allow their use in creation of mashups.

In some embodiments, generating digital right settings for media assets may be limited to allowing only portions of media assets within a package to be combined to form a mashup. For example, if a user buys an album such as "OVEREXPOSED" by "MAROON 5," the user may receive digital rights settings to only create a mashup from portions of media assets contained within the album.

In some embodiments, generating digital right settings for media assets may be limited to allowing portions of media assets across passages to be combined to form a mashup. For example, if a user buys two albums from artist "MAROON 5," the user may receive digital rights settings that allow creating a mashup from portions of a media asset from one album in combination with portions of a media asset from the other album.

In some embodiments, generating digital right settings for media assets may be based on one or more business rules specified by the content owner or distributor. For example, a user may have previously purchased an album from artist A, and received digital right settings allowing portions of media assets from artist A's album to be combined with media assets from other packages to form a mashup. Subsequently, the user may purchase an album from artist B and receive digital right settings that are limited based on a business rule associated with the album. The business rule may allow portions of media assets from artist B's album to be combined with other media assets except any media asset from artist A's album.

In another example, a user may purchase an album from artist A (who is a People for the Ethical Treatment of Animals (PETA) supporter) and receive digital right settings based on a business rule that allows portions of media assets from artist A's album to be combined with other media assets except any media asset that exhibits mistreatment of animals, e.g., a person kicking a dog or an unethical meat processing plant.

In some embodiments, generating digital right settings for media assets may allow a user to create a mashup from portions of one or more of the media assets and share the mashup with another user or a friend via email. The user may also share the mashup by posting on a social network or a blog. The other user or friend accessing the mashup may be required to possess certain qualifications in order to be eligible. For example, the other user may be required to view an advertisement before accessing the mashup. In another example, the systems and methods described may request the other user to purchase or obtain access rights for the media assets used in the mashup before accessing the mashup.

The amount of media assets available to users in any given content delivery system can be substantial. Consequently, many users desire a form of media guidance through an interface that allows users to efficiently navigate content selections and easily identify contest that they may desire. An application that provides such guidance is referred to herein as an interactive media guidance application or, sometimes, a media guidance application or a guidance application.

Interactive media guidance applications may take various forms depending on the content for which they provide guidance. Typical types of media guidance applications include interactive television program guides, guides for video-on-demand (VOD) services, guides for personal video recorders (PVRs), and other suitable guidance applications. Interactive television program guides (sometimes referred to as electronic program guides) are well-known guidance applications that, among other things, allow users to navigate among and locate many types of content.

As referred to herein, the term "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/ or any other media or multimedia and/or combination of the same. Guidance applications also allow users to navigate among and locate content. As referred to herein, the term "multimedia" should be understood to mean content that utilizes at least two different content forms described above, for example, heat, audio, images, video, or interactivity content forms. Content may be recorded, played, displayed or accessed by user equipment devices, but can also be part of a live performance.

With the advent or the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a Blu-ray player, a Blu-ray recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens.

In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided at online applications (i.e., provided on a web-site), or as standalone applications or clients on user equipment devices. The various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media on-demand listings, media-related information (e.g., titles, descriptions, ratings information (e.g., parental control ratings, critic's ratings, etc.), genre or category information, actor information, artist information, band information, artist logos, etc.), media format (e.g., standard definition, high definition, 3D, etc.), advertisement information (e.g., text, images, media clips, etc.), blogs, websites, and any other type of guidance data that is helpful for a user to navigate among and locate desired content selections.

Figure 2:
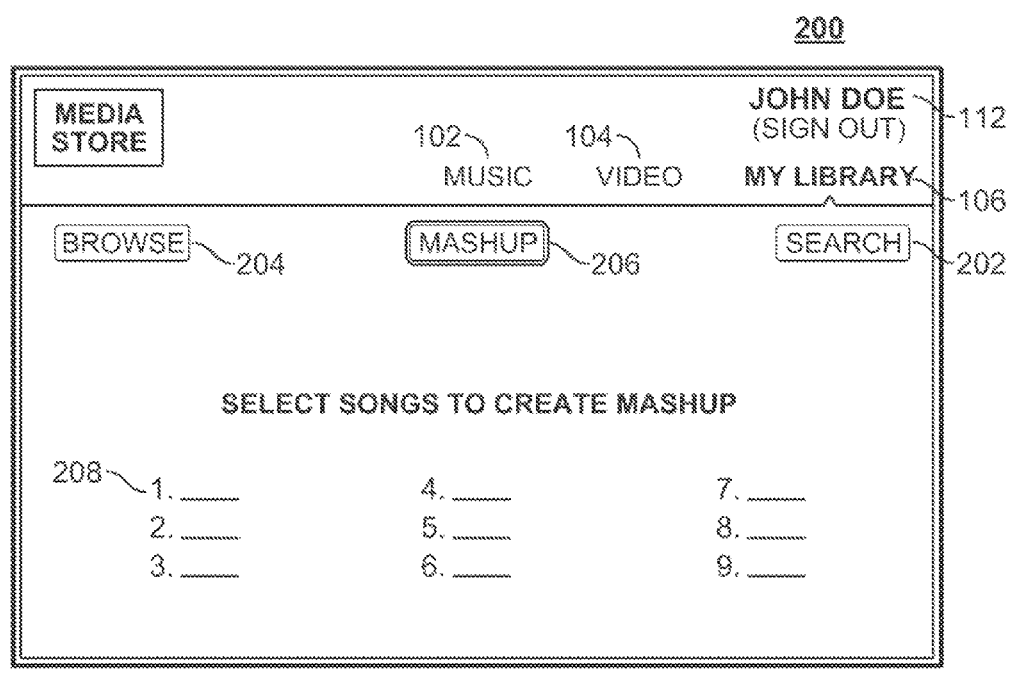

FIGS. 1-2 show display screens 100 and 200 that enable access to different types of media assets. The display screens shown in FIGS. 1-2 and 5-6 may be implemented on any suitable user equipment device or platform, e.g., the devices described with respect to FIGS. 3-4 below. While the displays of FIGS. 1-2 and 5-6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a STORE button) on a mouse, keyboard, trackpad, or other user input interface or device.

In response to the user's indication, the media guidance application may provide a display screen with media guidance data organized in one of several ways, such as by content type, by category (e.g., rock, pop, country, hip hop, or other categories of audio), by source, by price, or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative display 100 that enables access to different types of content in a single display. Display 100 may include: (1) Music tab 102, where users may view featured music promotions and may browse music content; (2) Video tab 104, where users may view featured video promotions and browse video content; and (3) My Library tab 106, where users may view and/or playback any purchased item in their library or "digital locker" from any compatible device with an Internet connection. With a user input device, a user may select from one of Music tab 102, Video tab 104, and My Library tab 106, or may search for relevant media via Search box 108. If a user does not wish to further interact with display 100, he may sign out via option 112. In response to control circuitry receiving selection or option 112, control circuitry may sign out the user.

In some embodiments, display 100 may also include a "Redeem Gift/Coupon" entry box, which allows users to redeem a gift card for store credit or enter a coupon promotion towards the purchase of specified music or video. Display 100 may optionally include a shopping cart icon. If there are no items in the cart, a message may appear telling the user that the cart is empty or that they need to sign in with their credentials to view items in their cart. If a user has items in their cart added from a particular device and they are viewing the cart from the same device on which the items were added, clicking on the shopping cart may show the items added from that device. In some embodiments, if a user has items in their cart added from any device, clicking on the cart may show their items added from all devices.

Music tab 102 may further include sub-navigation that enables users to quickly find music for purchase. For example, sub-navigation options 114-118 may include selectable options for "Top 10," "Most Popular," and "Recommended" media content. Information relating to featured music and important promotions may be provided in "Most Popular", option 114. In response to control circuitry receiving selection of option 114, control circuitry may provide music being purchased by a larger number of users, and may include promotions such as free music, discounted music, or any other suitable promotion. The "Top 10" option 116 may provide music released in the past week or another suitable time period and ranked/or high in the popularity charts. In response to control circuitry receiving selection of option 116, control circuitry may display the top ten songs or albums as determined by a contest provider. The "Recommended" option 118 may provide the user with suggested music based on past user interactions. For example, in response to control circuitry receiving selection of option 118, control circuitry may provide suggested music based on past music ratings, past music selections, or any other suitable past uses interaction. Hovering over a region may cause a mini details dialog to pop up. From the pop up, the user may buy the title or click a link to view additional information. Although display 100 is described with respect to Music tab in the above paragraph, the description may be equally or appropriately applicable to Video tab 104 and/or My Library tab 106.

In some embodiments, display 100 may provide media guidance data for purchasable content, downloaded or recorded content, and Internet content. A display combining media guidance data for content from different types of content sources is sometimes referred to as a "mixed-media" display. Various permutations of the types of media guidance data that may be displayed that are different than display 100 may be based on user selection or guidance application definition (e.g., a display of only purchasable and downloaded content, only purchasable and Internet content, etc.).

In some embodiments, option 114 of display 100 may allow the user to view and/or preview music titles being promoted. Displays including a video region are sometimes referred so as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 23, 2001, which are hereby incorporated by reference herein in their entireties. PIG displays may be included in other media guidance application display screens of the embodiments described herein.

In some embodiments, display 100 may provide advertisements for content that, depending on a viewer's access rights (e.g., for subscription programming), is currently available for viewing, will be available for viewing in the future, or may never become available for viewing, and may correspond to or be unrelated to option 116. The advertisements may also be for products or services related or unrelated to the content displayed in option 116. The advertisements may be selectable and provide further information about content, provide information about a product or a service, enable purchasing of content, a product, or a service, provide content relating to the advertisement, etc. Advertisements may be targeted based on a user's profile/preferences, monitored user activity, the type of display provided, or on other suitable targeted advertisement bases.

Advertisements may be provided in any suitable size, shape, and location in a guidance application display. For example, the advertisement may be provided as a rectangular shape, sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Additional options displayed in display 100 may include search options, VOD options, parental control options, Internet options, options, cloud-based options, device synchronization options, second screen device options, options to access various types of media guidance data displays, options to subscribe to a premium service, options to edit a user's profile, options to access a browse overlay, options to view related content that provides background information or context for a selected media content, options to view the related content on a second screen device, options to view additional related content, options to add related content to a queue for later viewing, options to resume playback of the selected media content, options to specify an ordering scheme and/or criteria, for the ordering scheme, or other suitable options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by signing in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only high, definition programming, re-ordering the display of content, recommended content, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication. No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Display 200 includes selectable options available when control circuitry receives a user selection of "MY LIBRARY" option 106 from display 100. The description below may be equally or appropriately applicable to user selection of any option 102, 104, or 106 from display 100. Display 200 may provide selectable options ouch as option 202 to search the user's library for media assets, option 204 to browse the user's library of media assets, or option 206 to select media assets to be used in creating a mashup. For example, control circuitry may receive user selection of one or more media assets from listings 208. The listings may include graphical images including cover art, still images, clip previews, or other types of content that indicate to a user the content being described by the media guidance data. Each or the listings 206 may also be accompanied by test to provide further information about the content. For example, the further information may include cover art, access to a clip, and information section including title, ratings, duration, release duration, whether available in HD, short description, artist, and album.

The listings 208 in display 200 are arranged to be the same size, but they may be of different sizes as well. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 19, 2005, which is hereby incorporated by reference herein in its entirety.

Figure 3:
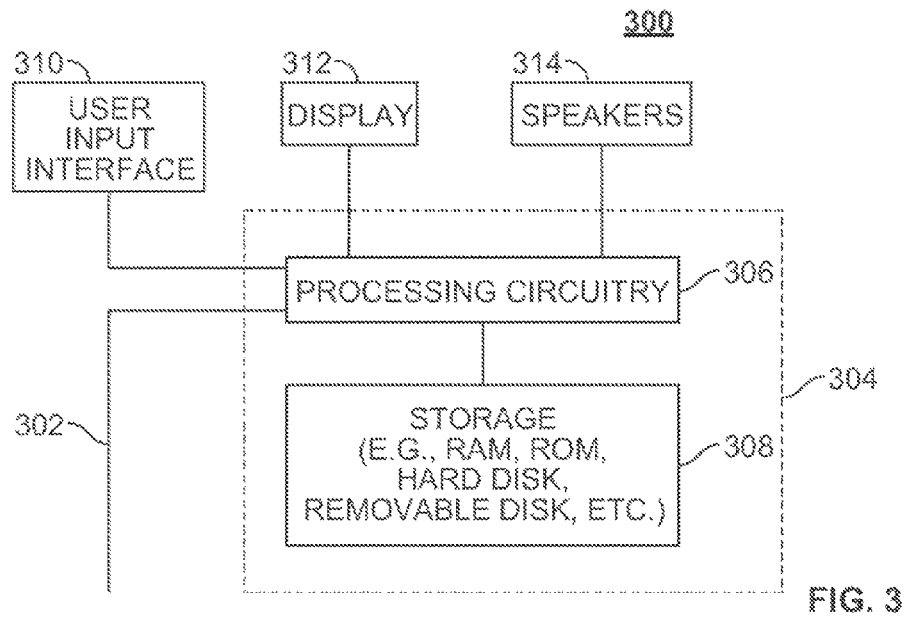
FIG. 3 shows an illustrative embodiment of a user equipment device.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below.

For example, the media guidance application may provide instructions to control circuitry 304 to generate the media guidance displays. In some implementations, any action performed by control circuitry 304 may be based on instructions received from the media guidance application. In some embodiments, control circuitry 304 executes instructions for determining whether the media asset is associated with a first package of media assets, cross-referencing a database of user order history to determine whether the user has obtained access rights for each media asset in the first package of media assets, generating digital rights settings for each media asset in the first package of media assets to enable the user to create a mashup, and generating a display based on the digital rights settings.

In client-server based embodiments, control circuitry 304 may include communications circuitry suitable for communicating with a guidance application server or other networks or servers. For example, control circuitry 304 may communicate with a remote server that stores reference blocks for different media content. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or parts (which is described in more detail in connection with FIG. 4). In addition, communications circuitry may include circuitry that enables peer-to-peer communication of user equipment devices, or communication of user equipment devices. In locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, commuter software, or firmware, such as random-access memory, read-only memory, hard drives, optical drives, digital video disc (DVD) recorders, compact disc (CD) recorders, Blu-ray disc (BD) recorders, Blu-ray 3D disc recorders, digital video recorders (DVR, sometimes called a personal, video recorder, or PVR), solid state devices, quantum storage devices, gaming consoles, gamins media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 503 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 334 may also include scaler circuitry for upconverting and downconverting content into the preferred output format of the user equipment device 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment device 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output so the display 312. The video card may offer various functions such as accelerated rendering of 3D scenes and 2D graphics, MPEG-2/MPEG-4 decoding, TV outputs or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304 (FIG. 3). For example, the guidance application may be an EBIF application. In some embodiments, the guidance application may be defined by a series of JAVA-based files that are received and run by a local virtual machine or other suitable middleware executed by control circuitry 304 (FIG. 3). In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
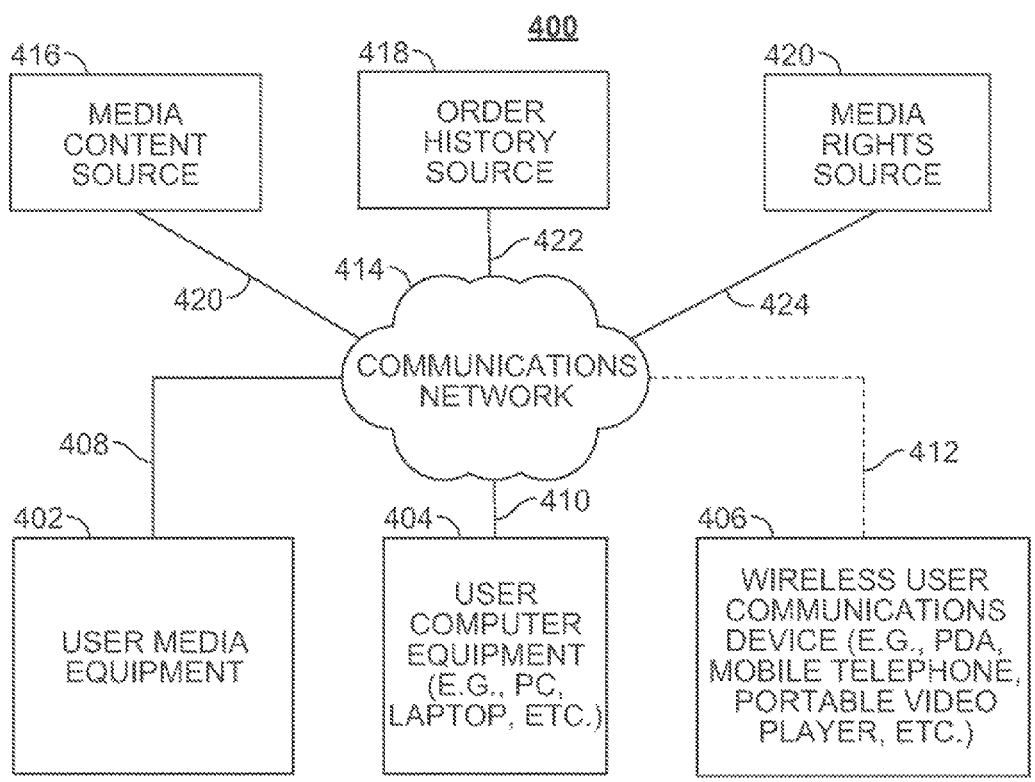
FIG. 4 is a diagram of an illustrative embodiment of a cross-platform interactive media system.

User equipment device 300 of FIG. 3 can be implemented in system 400 of FIG. 4 as user media equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the systems features described above in connection with FIG. 3 may not be classified solely as user media equipment 402, user computer equipment 404, or a wireless user communications device 406. For example, a user media equipment 402 may, like some user composer equipment 404, be Internet-enabled, allowing for access to Internet content. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user media equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building or in a different building from the first device.

The user may also set various settings to maintain consistent media guidance application settings across in-home devices and remote devices. Settings include those described herein, as well as music and video favorites, content preferences that the guidance application utilizes to make recommendations, display preferences, playback preferences, and other desirable guidance settings. For example, if a user sets a playlist as a favorite on, for example, the web site www.allrovi.com on their personal computer at their office, the same playlist would appear as a favorite on the user's in-home devices (e.g., user media equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user media equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well, other short-range point-to-point communication paths, such as USB cables, IEEE 1334 cables, wireless paths (e.g., Bluetooth, infrared, IEEE 802-11x, etc), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416, order history source 418, and media rights source 420, coupled to communications network 414 via communication paths 420, 422, and 424, respectively. Paths 420, 422, and 424 may include any of the communication paths described above in connection with paths 408, 410, and 412. Communications with media content source 416, order history source 418, and media rights source 420 may be exchanged over one or more communications paths, but are shown as a single path in FIG. 4 to avoid overcomplicating the drawing. In addition, there may be more than one of each of media content source 416, order history source 418, and media rights source 420, but only one of each is shown in FIG. 4 to avoid overcomplicating the drawing. (The different types of each of these sources are discussed below.) If desired, one or more of media content source 416, order history source 418, and media rights source 420 may be integrated as one source device. Although communications between sources 416, 418, and 420 with user equipment devices 402, 404, end 406 are shown as through communications network 414, in some embodiments, sources 416, 418, and 420 may communicate directly with user equipment devices 402, 404, and 406 via communication paths (not shown) such as those described above in connection with paths 408, 410, and 412.

Media content source 416 may include one or more types or content distribution equipment including digital media, stores, web servers, Internet content providers, streaming media servers, on-demand media servers, television distribution facilities, cable system headends, satellite distribution facilities, programming sources (e.g., television broadcasters, such as NBC, ABC, HBO, etc.), intermediate distribution facilities and/or servers, and other content providers. NBC is a trademark owned by the National Broadcasting Company, Inc., ABC is a trademark owned by the ABC, INC., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of recorded content for downloading, etc). Content source 416 may also include a remote media server used to store different types of content (including music and video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Order history source 418 may provide information on purchases made by a user over a given period of time. Order history data may be provided to the user equipment devices using any suitable approach. In some embodiments, the guidance application may receive order history data via a data feed (e.g., a continuous feed or trickle feed). Order history data may be provided to the user equipment on a television channel sideband, using an in-band digital signal, using an out-of-band digital signal, or by any other suitable data transmission technique. Order history data may be provided to user equipment on multiple analog or digital channels.

In some embodiments, order history data from order history source 416 may be provided to users' equipment using a client-server approach. For example, a user equipment device may pull order history data from a server, or a server may push order history data to a user equipment device. In some embodiments, a guidance application client residing on the user's equipment may initiate sessions with source 418 to obtain order history data when needed, e.g., when the data is out of date or when the user equipment device receives a request from the user to receive data. Order history data may be provided to the user equipment with any suitable frequency (e.g., continuously, daily, a user-specified period of time, a system-specified period or time, in response to a request from user equipment, etc.).

Media rights source 420 may provide digital rights data including digital right settings and related information for a media asset. Digital rights data may be provided to the user equipment devices using any suitable approach. In some embodiments, the guidance application may receive data via a data feed is (e.g., a continuous feed or trickle feed). Digital rights data may be provided to the user equipment on a television channel sideband, using an in-band digital signal, using an out-of-band digital signal, or by any other suitable data transmission technique. Digital rights data may be provided to user equipment on multiple analog or digital television channels.

In some embodiments, digital rights data from media rights source 420 may be provided to users' equipment using a client-server approach. For example, a user equipment device may pull digital rights data from a server, or a server may push digital rights data to a user equipment device. In some embodiments, a guidance application client residing on the user's equipment may initiate sessions with source 420 to obtain digital rights data when needed, e.g., when the user equipment device receives a request from the user to receive data. Digital rights data may be provided to the user equipment, with any suitable frequency (e.g., continuously, daily, a user specified period or time, a system-specified period of time, in response to a request from user equipment, etc.).

Media guidance applications may be, for example, stand-alone applications implemented on user equipment devices. For example, the media guidance application may be implemented as software or a set of executable instructions which may be stored in storage 308 and executed by control circuitry 304 (FIG. 3) of a user equipment device 300. In some embodiments, media guidance applications may be client-server applications where only a client application resides on the user equipment device, and server application resides on a remote server. For example, media guidance applications may be implemented partially as a client application on control circuitry 304 (FIG. 3) of user equipment device 300 and partially on a remote server as a server application (e.g., media content source 416) running on control circuitry of the remote server. When executed by control circuitry of the remote server (such as media content source 416), the media guidance application may instruct the control circuitry to generate the guidance application displays and transmit the generated displays to the user equipment devices. The server application may instruct the control circuitry of the media content source 416 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution or the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu, is a trademark owned by Hulu, LLC. OTT content providers may additionally or alternatively provide media guidance (or reference block) data described above. In addition to content and/or media guidance (or reference block) data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content, guidance, and reference block data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., playlists, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with media content source 416 to access content. Specifically, within a home, users of user media equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more media content sources 416, one or more order history sources 418, and one or more media rights sources 420. In addition or in the alternative, the remote computing sites may include other user equipment devices, such as user media equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications or the same. The user equipment device may be a cloud client that relies on cloud computing for application delivery, or the user equipment device may have some functionality without access to cloud resources. For example, same applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or, a user device can download content from multiple cloud resources for more efficient downloading. In some embodiments, user equipment devices can use cloud resources for processing operations such as the processing operations performed by processing circuitry described in relation to FIG. 3.

FIG. 3 shows an illustrative display screen 500 showing a user requesting access tights to a media asset. The user may search and select an audio asset from display 100 (FIG. 1) for ordering or obtaining access rights. In the example shown, section 502 of the display screen 500 shows that the user wishes to order the audio media asset "ONE MORE NIGHT" by artist "MAROON 5." Section 508 includes a purchase price for the order, and indicates that the media asset is on sale. The user may confirm his order by selecting option 504 via a user input device, e.g., user input interface 310 (FIG. 3). In response to control circuitry 304 (FIG. 3) receiving selection of option 504, control circuitry 304 (FIG. 3) may retrieve the audio asset and generate digital rights settings that confer access rights to the user. For example, control circuitry 104 (FIG. 3) may retrieve the audio asset from media content source 416 (FIG. 4), and the digital rights settings may be retrieved from media rights source 420 (FIG. 4). In some embodiments, the digital rights settings may be stored within the audio asset. In some embodiments, the digital rights settings may be stored as a separate file. Alternatively, the user may cancel his order by selecting option 506. In response to control circuitry 304 (FIG. 3) receiving selection of option 406, control circuitry 304 (FIG. 3) may return to display 100 (FIG. 1).

Figure 5:
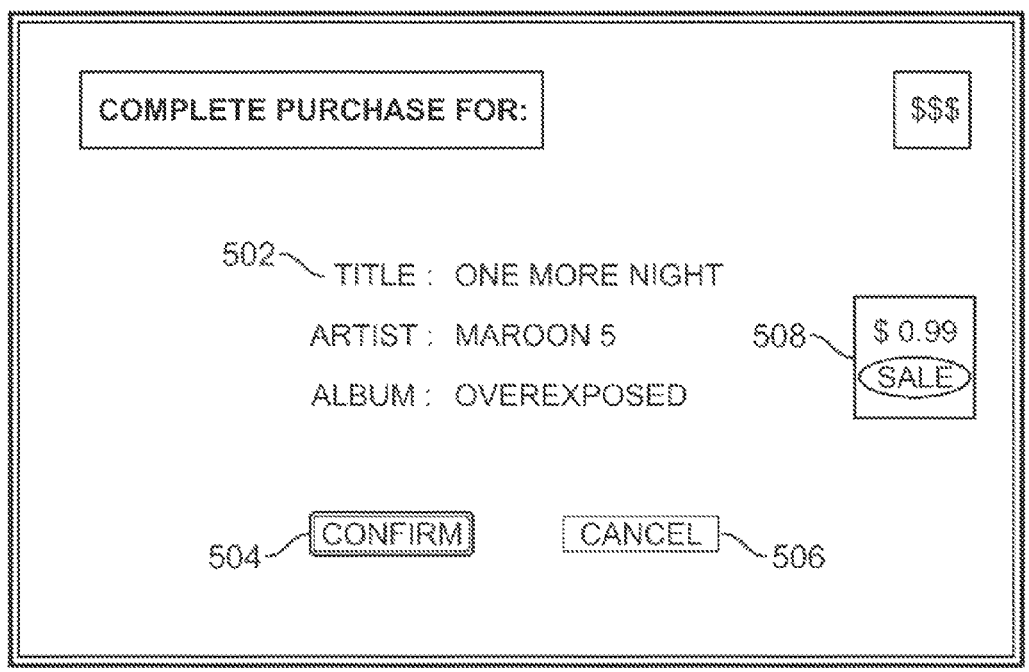
FIG. 5 shows an illustrative embodiment of a display screen for providing access rights of a media asset to a user.
Figure 6:
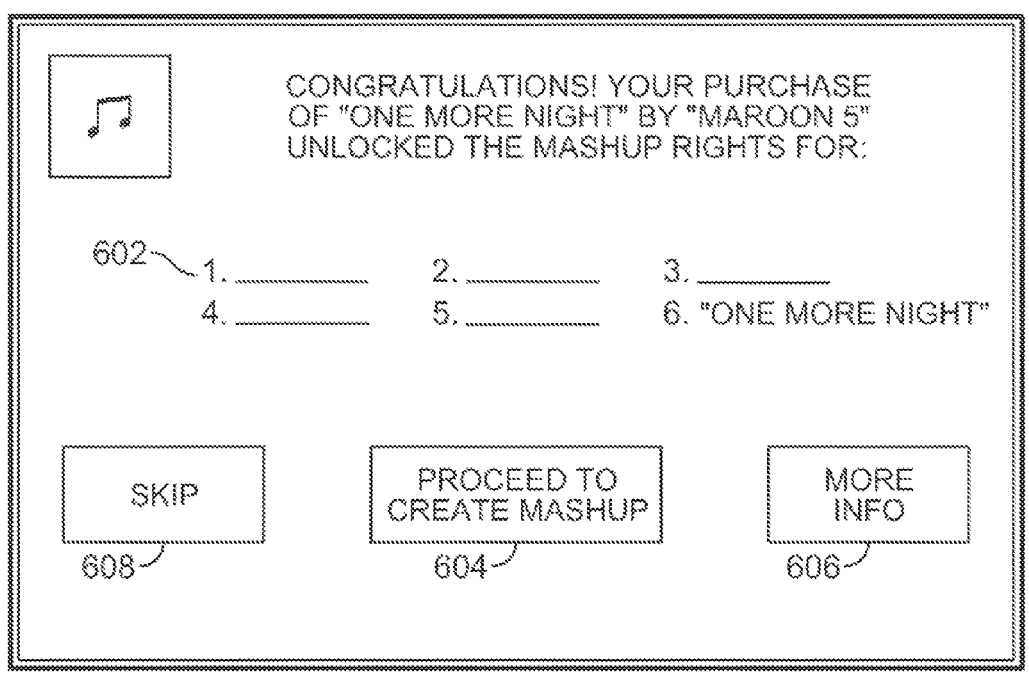
FIG. 6 shows an illustrative embodiment of a display screen providing digital rights settings to create a mashup from certain media assess.

In some embodiments, a purchase may entitle the user to "rewards" associated with the media asset, such as digital rights settings for enabling the user to create mashups. FIG. 6 shows an illustrative display screen 600 showing a user receiving digital rights for creating a mashup using certain media assets. In the example shown, the user's purchase of "ONE MORE NIGHT" from display 500 (FIG. 5) results in display 600. Once the purchase is confirmed, control circuitry 304 (FIG. 3) may determine whether the media asset is associated with a package of media assets, such as an album. Control circuitry 304 (FIG. 3) may cross-reference a database of user order history, e.g., order history source 418 (FIG. 4), to determine whether the user has obtained access rights for each media asset in the package of media assets. For example, control circuitry 304 (FIG. 3) may cross-reference order history source 418 (FIG. 4) to determine whether the user has ordered each media asset in the album "OVEREXPOSED" BY "MAROON 5." If the user has obtained access rights for each media asset in the package of media assets, control circuitry 304 (FIG. 3) may generate digital rights settings for each media asset in the package to enable the user to create a mashup, and generate display 600 based on the digital rights settings.

In FIG. 6, control circuitry 304 (FIG. 3) generates display 600 showing than the user has unlocked mashup rights for media assets 302, e.g., each media asset in the album "OVEREXPOSED" that is associated with the user's most recently purchased media asset. Display 600 may include option 604 to proceed to creating a mashup including portions of one or more of the media assets. In response to control circuitry 304 (FIG. 3) receiving selection of option 604, control circuitry 304 (FIG. 3) may offer digital software for creating the mashup from the media assets of the package. The digital software may allow the user to create mashups from media assets having appropriate digital rights settings. Display 600 may also include an option 608 to skip the screen or option 606 to retrieve more information on mashups and how to create mashups.

In some embodiments, the user may share mashups generated via option 604 with another user or a friend via, e.g., communications network 414 (FIG. 4). The user may share the mashup via email, by posting on a social network or a blog, or any other suitable mechanism. The other user or friend accessing the mashup may be required to possess certain qualities in order to be eligible. For example, the other user may be required to view an advertisement before accessing the mashup. In another example, the other user may be required to purchase or obtain access rights for the media assets used in the mashup before accessing the mashup. For example, if the user used three media assets from the album OVEREXPOSED in creating his mashup, his friend may be required to obtain access rights for those three media assets.

Such sharing of mashups may provide an extra stream of revenue for the publisher of the media assets in terms of advertising revenue. Additionally, such sharing may promote the media assets and their associated packages to other users and potentially increase sales. For example, the other user or friend who accesses the mashup may be motivated to review more media assets by the same artist or from the same album, and potentially purchase these media assets for his personal library.

Figure 7:
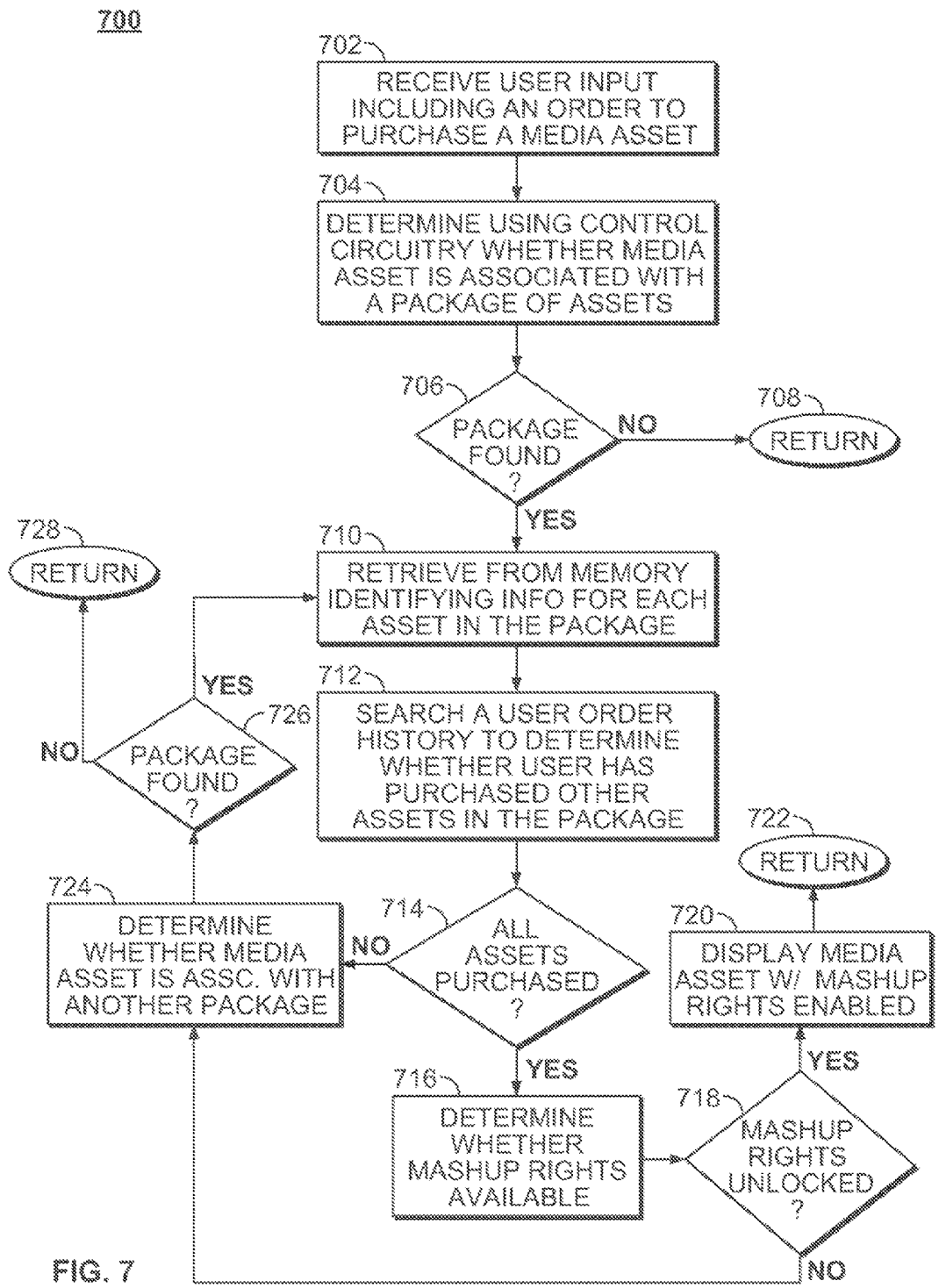
FIG. 7 shows an illustrative embodiment of a flow diagram for managing digital right settings.

FIG. 7 shows illustrative flow diagram 700 for managing digital rights of media assets. At step 702, control circuitry 304 (FIG. 3) receives user input via, e.g., user input interface 310 (FIG. 3), including an order to purchase or obtain access rights to a media asset. For example, control circuitry 304 (FIG. 3) may ream ace an order for an audio or video asset from display 500 (FIG. 3). At step 704, control circuitry 304 (FIG. 3) determines whether the media asset is associated with a package of media assets. For example, control circuitry 304 (FIG. 3) may determine that an audio asset is associated with a music album.

At step 706, if a package is found, control circuitry 304 (FIG. 3) proceeds to step 710. Otherwise, at step 708, control circuitry 304 (FIG. 3) returns to the previous display, e.g., display 500. As step 710, control circuitry 304 (FIG. 3) retrieves identification information for each media asset in the package from, e.g., media content source 416 (FIG. 4). For example, control circuitry 304 (FIG. 3) may retrieve information for each audio asset in a music album. At step 712, control circuitry 304 (FIG. 3) cross-references a database of user order history, e.g., order history source 418 (FIG. 4), to determine whether the user has purchased each media asset in the package. At step 714, if all media assets in the package have not been purchased, control circuitry 304 (FIG. 3) proceeds to step 724.

At step 724, control circuitry 304 (FIG. 3) determines whether the media asset is associated with another package of media assets. For example, control circuitry 304 (FIG. 3) may determine that the media asset is associated with another music album that includes the media asset. For example, the media asset may be included in a "best hits" album or another suitable package. At step 726, if a package is found, control circuitry 304 (FIG. 3) proceeds to step 710. Otherwise, at step 728, control circuitry 304 (FIG. 3) returns to the previous display, e.g., display 500 (FIG. 5).

At step 714, if all media assets in the package have been purchased, control circuitry 304 (FIG. 3) proceeds to step 716. At step 716, control circuitry 304 (FIG. 3) retrieves digital rights settings for the media assets in the package from, e.g., media rights source 420 (FIG. 4). Control circuitry 304 (FIG. 3) determines whether the publisher or content owner for the package allows using the media assets in the package for creating mashups. For example, the original content owner may block usage of the media assets in the package for creating a mashup based on one or more business rules. The original content owner may allow portions of media assets in the package to be combined with other media assets except for certain media assets blocked based on the business rules.

Figure 8:
FIG. 8 shows an illustrative embodiment of license metadata having digital right settings for a media asset.

At step 720, if the publisher does not allow using the media assets in the package for creating mashups, control circuitry 304 (FIG. 3) proceeds to step 724. If the publisher does allow using the media assets in the package for creating mashups, control circuitry 304 (FIG. 3) proceeds to step 720. At step 720, control circuitry 304 (FIG. 3) generates digital rights settings to indicate that the media assets in the package may be used for creating mashups. FIG. 8 below provides further details on generating such digital rights settings. Control circuitry 304 (FIG. 3) generates a display, e.g., display 600 (FIG. 3), indicating that the rights are available. At step 722, control circuitry 304 (FIG. 3) returns to display 600 (FIG. 6) for further interaction with the user.

FIG. 8 shows license metadata 800 having digital right settings for a media asset. License metadata 600 may be retrieved from media rights source 420 or any other suitable device or location accessible via communication network 414 (FIG. 4). License metadata 800 may be included in a media asset, kept as a separate file, or stored and/or retrieved in any other suitable manner. License metadata 800 may include a plurality of lines. In some embodiments, the presence of a particular value or values in license metadata 800 may indicate digital right settings for a media assess that allow a user to use the media asset in creating a mashup.

To the illustrated embodiment, license metadata 800 includes line 802. Line 802 indicates the beginning of digital rights settings in license metadata 800 associated with a media asset, and line 826 indicates the end of digital rights settings in license metadata 800 associated with the media asset. Line 804 indicates the "title" of the media asset associated with license metadata 800. Lines 806 and 808 indicate additional information for the media asset associated with license metadata 800 including "artist" and "album." For example, one or more of lines 804-808 may be processed by control circuitry 804 (FIG. 3) to indicate that the received data relates to an audio asset. For example, license metadata 800 may correspond to an audio asset displayed in display 100 (FIG. 1).

Line 810 indicates the beginning of package indicators associated with the media asset. Line 816 indicates the end of package indicators associated with the media asset. In some embodiments, control circuitry 304 (FIG. 3) may use the package indicators to determine one or more packages associated with the media asset. In the embodiment shown, the package indicators include two package (lines 812-814) associated with the media asset. It should be noted that the groups described herein are illustrative only and are not limiting. Additional groups (or fewer groups) may be used in accordance with this disclosure.

Lines 812-814 indicate that the media asset is associated with two packages, which in the illustrated embodiment are albums "MAROON 5, BEST OF" and "OVEREXPOSED." Control circuitry 304 (FIG. 3) may use this information to determine the associated packages in steps 704 and 724 of flow diagram 700 (FIG. 7). Control circuitry 304 (FIG. 3) may subsequently search order history source 418 (FIG. 4) to determine whether the user has purchased each media asset in the determined package.

Line 818 indicates the beginning of digital rights settings related to usage of the media asset in a mashup. Line 324 indicates the end of digital rights settings related to usage of the media asset in a mashup. In some embodiments, control circuitry 304 (FIG. 3) may use the digital rights setting's to determine whether the media asset may or may not be used in creating a mashup. Furthermore, control circuitry 304 (FIG. 3) may include or modify digital rights settings to enable the user to include portions of the media asset in a mashup. In the embodiment shown, the digital rights settings include indicators "DISABLED" for "PACKAGE 1," i.e., album "MAROON 5, BEST OF" (line 820) and "ENABLED" for "PACKAGE 2," i.e., album "OVEREXPOSED" associated with the media asset.

The indicator in line 820 may be "DISABLED" either because the original content owner does not allow for mashups that include media assess from that package, or because the user has not yet purchased or obtained access rights to each media asset in the package. The indicator in line 822 may be "ENABLED" because the user has purchased or obtained access rights to each media asset in the package. The "ENABLED" indicator may allow the user to use portions of one or more media assets from "PACKAGE 2," i.e., album "OVEREXPOSED" to create a mashup. Control circuitry 304 (FIG. 3) may retrieve and/or modify this information when inspecting digital rights settings in steps 716 and 720 of flow diagram 700 (FIG. 7).

In some embodiments, the digital rights settings include indicators "ENABLED" for "PACKAGE 1," i.e., album "MAROON 5, BEST OF" (line 820) and "ENABLED" for "PACKAGE 2," i.e., album "OVEREXPOSED" associated with the media asset. The indicator in line 820 may be "ENABLED" because the user has purchased or obtained access rights to each media asset in the package. These digital right settings for media assets may allow portions of media assets across both albums to be combined to form a mashup. For example, the user may creates a mashup from pervious of a media asset from one album in combination with portions of a media asset from the other album.

It should be noted that the groups described herein are illustrative only and are not limiting. Additional groups (or fewer groups) may be used in accordance with this disclosure. License metadata 800 may be stored on, or retrieved from, media rights source 420 or any other suitable device or location accessible via communication network 414.

It will be appreciated that while the discussion of media assets has focused on audio content, the principles described above can be applied to other types of media assets, such as video, images, etc. If will also be appreciated that while the discussion of digital rights settings has focused on at most two packages, the principles described above can be applied to individual assets, multiple packages, as well as combinations of individual assets and packages.

The foregoing is merely illustrative of the principles or the systems and methods described herein, and various modifications can be made by those skilled in the art without departing from the scope and spirit of the systems and methods described herein. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. The above described embodiments are presented for purposes of illustration and not of limitation, and the systems and methods described herein are limited only by the claims which follow.

What is claimed is:

1. A method for managing digital rights settings, comprising:
    receiving user input including an order for obtaining access rights to a media asset;
    determining, using control circuitry, whether the media asset is associated with a first package of media assets and a second package of media assets;
    cross-referencing a database of user order history to determine whether a user has obtained access rights for each media asset in the first package of media assets and for each media asset in the second package of media assets;
    in response to determining that the user has obtained access rights for each media asset in the first package of media assets and for each media asset in the second package of media assets, generating digital rights settings for creating a mashup including portions of at least one media asset in the first package of media assets and at least one media asset in the second package of media assets; and
    receiving user input to create the mashup, wherein the mashup includes the portions of the at least one media asset in the first package of media assets and the at least one media asset in the second package of media assets.

2. The method of claim 1, wherein each media asset comprises license metadata.

3. The method of claim 2, wherein generating the digital rights settings for creating the mashup comprises updating the license metadata for each media asset.

4. The method of claim 1, wherein the digital rights settings allow the user to transmit the mashup to a second user via at least one of a social network and an e-mail.

5. The method of claim 4, wherein the second user is required to view an advertisement before the mashup is accessed.

6. The method of claim 4, wherein the second user is required to obtain access rights for each media asset included in the mashup before the mashup is accessed.

7. The method of claim 1, further comprising: generating for display, using control circuitry, an offering for digital software for creating the mashup.

8. The method of claim 1, wherein the digital rights settings for each media asset are generated based on one or more business rules.

9. A system for managing digital rights settings, comprising:
    control circuitry configured to:
        receive user input including an order for obtaining access rights to a media asset;
        determine, whether the media asset is associated with a first package of media assets and a second package of media assets;
        cross-reference a database of user order history to determine whether a user has obtained access rights for each media asset in the first package of media assets and for each media asset in the second package of media assets;
        in response to the determination that the user has obtained access rights for each media asset in the first package of media assets and for each media asset in the second package of media assets, generate digital rights settings for creating a mashup including portions of at least one media asset in the first package of media assets and at least one media asset in the second package of media assets; and
        receive user input to create the mashup, wherein the mashup includes the portions of the at least one media asset in the first package of media assets and the at least one media asset in the second package of media assets.

10. The system of claim 9, wherein each media asset comprises license metadata.

11. The system of claim 10, wherein generating the digital rights settings for creating the mashup comprises an update of the license metadata for each media asset.

12. The system of claim 9, wherein the digital rights settings allow the user to transmit the mashup to a second user via at least one of a social network and an e-mail.

13. The system of claim 12, wherein the second user is required to view an advertisement before the mashup is accessed.

14. The system of claim 12, wherein the second user is required to obtain access rights for each media asset included in the mashup before the mashup is accessed.

15. The system of claim 9, wherein the control circuitry is further configured to generate for display, an offering for digital software for creating the mashup.

16. The system of claim 9, wherein the digital rights settings for each media asset are generated based on one or more business rules.

* * * * *